United States Patent [19]

Liebert et al.

[11] 4,237,773
[45] Dec. 9, 1980

[54] PRESSURE MEDIUM CONTROLLER FOR MOTOR VEHICLE STEERING SYSTEMS

[75] Inventors: Karl-Heinz Liebert, Schwabsich; Werner Tischer, Unterbobingen; Josef Deppenbrock, Schwabisch; Kurt Leberfinger, Mogglingen, all of Fed. Rep. of Germany

[73] Assignee: Zahnradfabrik Friedrichshafen AG., Friedrichshafen, Fed. Rep. of Germany

[21] Appl. No.: 960,922

[22] Filed: Nov. 15, 1978

[30] Foreign Application Priority Data

Nov. 4, 1977 [DE] Fed. Rep. of Germany ....... 2749352

[51] Int. Cl.³ ..................... F15B 11/08; F15B 13/04
[52] U.S. Cl. ..................................... 91/467; 91/391
[58] Field of Search ............... 91/467, 391; 60/384; 137/596, 596.13

[56] References Cited

U.S. PATENT DOCUMENTS

| Re. 25,126 | 2/1962 | Charlson | 91/467 |
|---|---|---|---|
| 2,984,215 | 5/1961 | Charlson | 91/467 |
| 3,385,057 | 5/1968 | Pruvot et al. | 60/384 |
| 3,528,521 | 9/1970 | Ellis | 91/467 |
| 4,109,679 | 8/1978 | Johnson | 91/567 X |
| 4,174,612 | 11/1979 | Liebert | 60/384 |

FOREIGN PATENT DOCUMENTS 1293029 4/1969 Fed. Rep. of Germany .

*Primary Examiner*—Leonard D. Christian
*Attorney, Agent, or Firm*—Zalkind & Shuster

[57] ABSTRACT

Relatively dispaceable valve elements of a pressure controller for a vehicle steering system provided with radial bore type valve passages having two different flow area dimensions to regulate the pressure of fluid supplied to a servomotor in response to displacement of the valve elements to an operating position from a neutral position in which the valve passages establish a short circuit flow path between the pressure source and a low pressure outlet. Flow through the short circuit passages in the valve elements are blocked in sequence during displacement of the valve elements to the operating position by sequential closing of flow passages in one of the valve elements.

9 Claims, 7 Drawing Figures

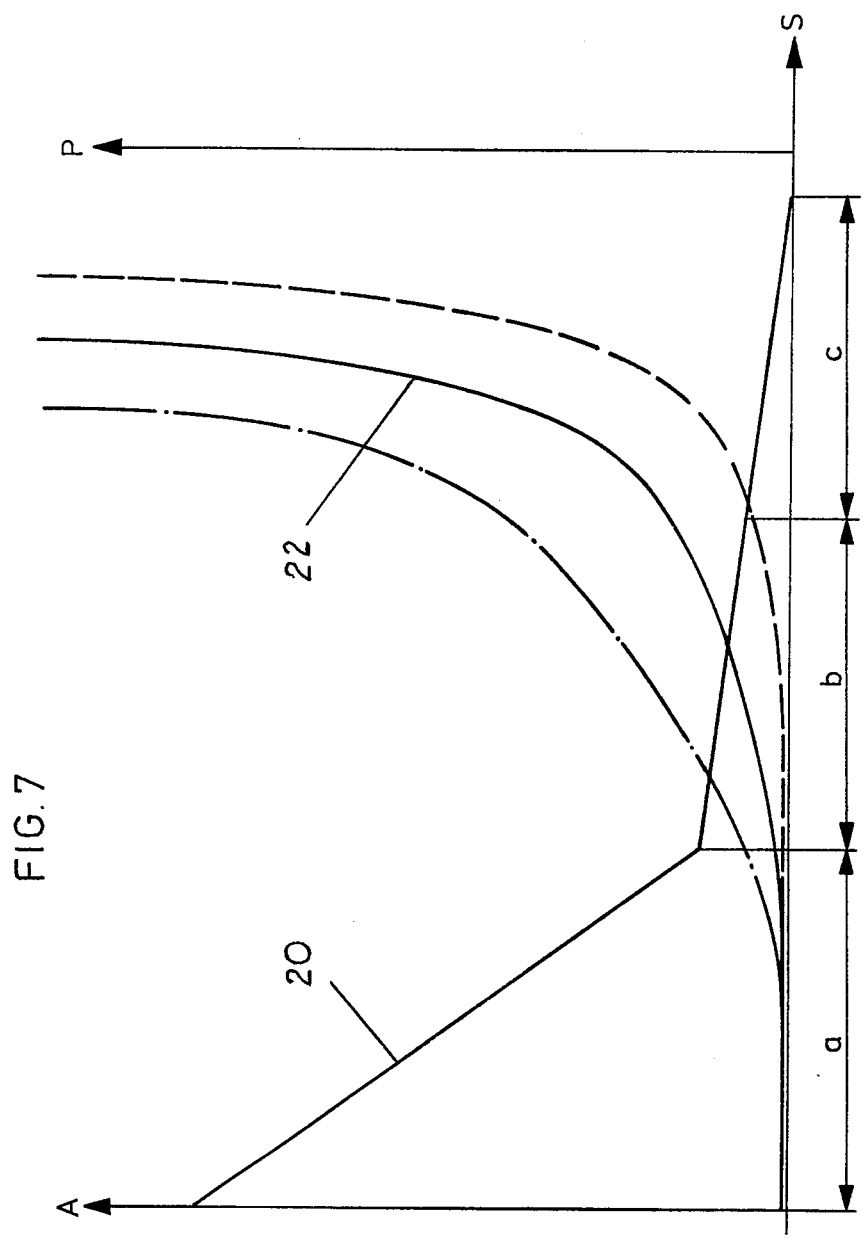

PRESSURE MEDIUM CONTROLLER FOR MOTOR VEHICLE STEERING SYSTEMS

BACKGROUND OF THE INVENTION

This invention relates to a controller for a pressure medium especially adapted for hydrostatic steering systems of motor vehicles.

Pressure controllers for hydrostatic steering systems having relatively displaceable valve elements are well known. Such valve controllers are displaceable from a neutral position to two operating positions. In the neutral position, the valve elements establish a short circuit connection between a pressure inlet and outlet through a conduit system formed by a plurality of radial passages. One of the valve elements is drivingly coupled to the hand steering wheel while the other valve element is drivingly coupled to a fluid metering pump also operated by the hand steering wheel, through which metered pressure fluid is delivered to a steering servomotor. Such an arrangement of relatively displaceable valve elements with radial valve passages to regulate the operating pressure delivered to the servomotor is disclosed in German Patent No. AS 2156842. The radial valve passages in such a valve controller are provided with three different flow area diameters wherein pairs of passages in one valve element cooperate with the passages of the other valve element in order to effect regulation of the operating pressure during displacement of the valve elements without fluctuations in the control pressure. It is well known that such pressure fluctuations may be avoided by controlling the increase of the operating pressure medium in accordance with a predetermined pressure characteristic represented by a compound curve such as a catenary. In order to obtain such a pressure variation characteristic, the flow area of the short circuit path established in the neutral position of the valve elements, must be initially decreased at a rapid rate and subsequently at a lower rate. In order to achieve the foregoing objective, pressure controllers heretofore utilized were provided with many radial bores in both valve elements having at least three different flow area diameters. As a result of the number of radial bores required and the variation in diameters, certain constructional limitations were imposed on the design of the valve controller and certain manufacturing difficulties were introduced to provide radial bores of several sizes. The economic disadvantage associated with the aforementioned valve controllers is particularly aggravated when producing valve elements that are relatively displaceable solely in the axial or an angular direction, because of the relatively short valve adjusting path available in such valve controllers.

It is therefore an important object of the present invention to provide a pressure controller of the aforementioned type having the aforementioned advantages associated therewith but capable of being made in a more economical fashion.

SUMMARY OF THE INVENTION

In accordance with the present invention, a pressure controller of the aforementioned type is provided wherein the radial valve passages associated with relatively displaceable valve elements, are limited to two different flow area diameters or sizes and wherein the valve passages in one of the valve elements are of equal size. The larger size passages are provided in the other valve element together with a larger number of smaller size passages. Each of the larger size valve passages in the other of the valve elements cooperates only and always with passages of smaller flow area diameter in said one of the valve elements. By means of the foregoing conduit arrangement of passages, pressure may be precisely controlled to obtain the desired pressure characteristics aforementioned. During an initial phase of valve adjustment, those small sized valve passages aligned with each other to establish the short circuit flow path are rapidly closed followed by sequential closing of those passages in communication with the larger flow passages. As a result of the foregoing valve conduit arrangement, the production costs for valve elements may be substantially decreased.

Under certain circumstances it is also advantageous to establish fluid communication between several small size passages and each larger passage. Such an arrangement is particularly suitable where the valve elements are displaced relative to each other in both axial and angular directions forming a diagonal path, although the invention also contemplates valve controllers that are adjustable only along an axial or angular path.

Where the valve controller is displaceable along a diagonal path so that the radial valve passages move at an angle to the direction of movement of one valve element, greater precision in pressure control may be obtained by selection of an optimum angular relationship such as 45°. The length of the valve adjusting path and the flow blocking period is thereby prolonged by a maximum amount.

In the foregoing arrangement, a pair of passages communicating with the larger flow area passage are so disposed in relationship thereto that immediately after closing of one passage is completed, closing of the other passage begins. This sequence produces a smooth transition in the pressure characteristic curve. During the transition interval, the smaller passages are disposed tangentially to the wall of the large size passage.

Another feature of the invention resides in the provision of radial passages with the larger cross sectional flow area disposed in that valve element which communicates directly with the low pressure outlet for the pressure medium. Because of this feature, the high pressure surfaces of the valve assembly are smaller to reduce the losses that occur as a result of leakage.

BRIEF DESCRIPTION OF DRAWING FIGURES

FIG. 5 is a passage arrangement view similar to that of FIG. 3 corresponding to the control valve assembly in an operating position.

FIG. 7 is a graphical illustration showing the short circuit flow area variation and pressure characteristics associated with the control valve assembly of the present invention.

DETAILED DESCRIPTION OF A PREFERRED EMBODIMENT

Figure 1:
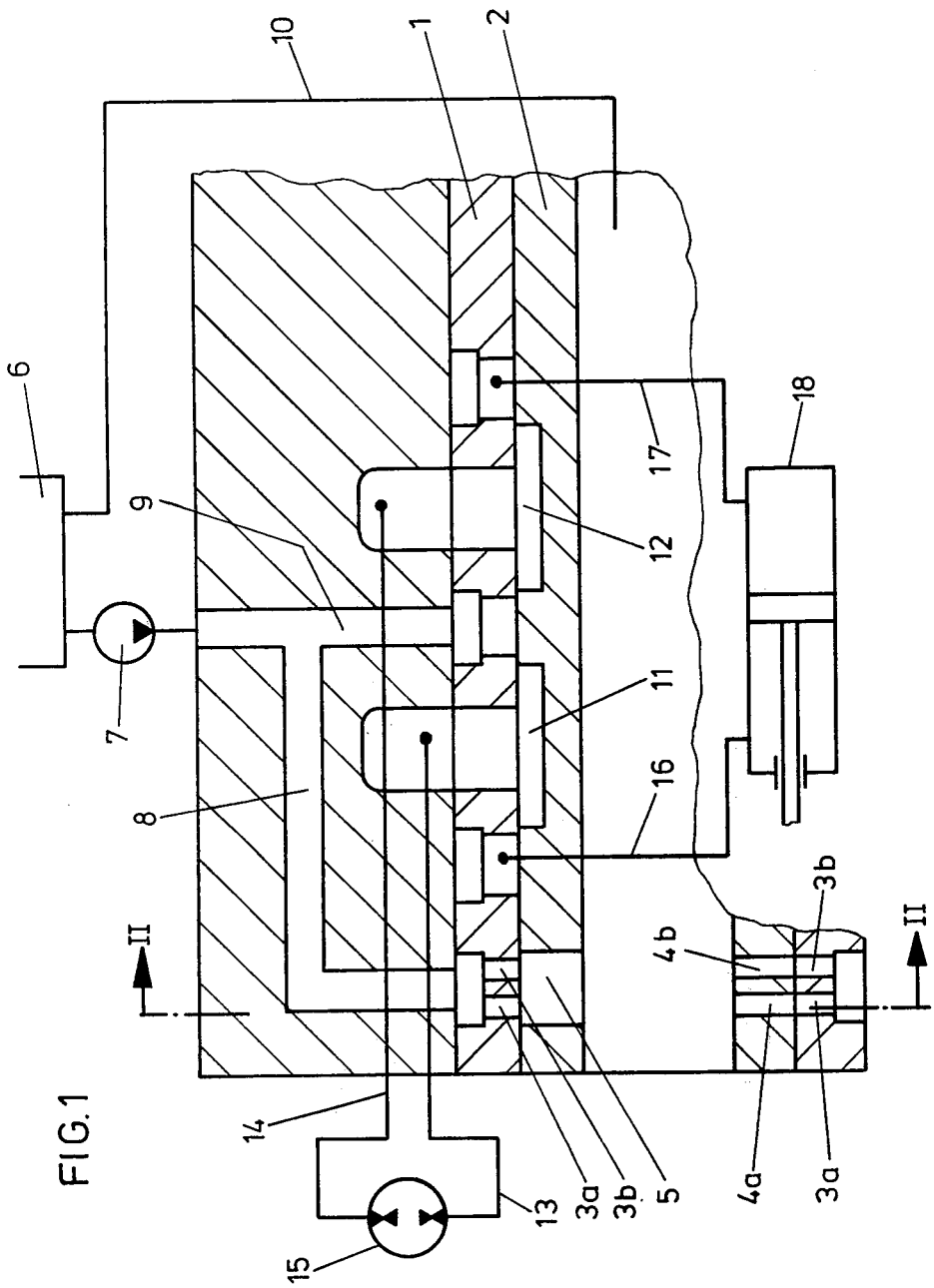
FIG. 1 is a partial side sectional view of a pressure control valve assembly constructed in accordance with the present invention together with a fluid circuit diagram showing connections to certain components of a hydrostatic steering system.

Referring now to the drawings in detail, FIG. 1 illustrates a portion of a pressure control valve assembly for a motor vehicle steering system, the major details of which are generally well known. Such a pressure controller for a vehicle steering system is disclosed, for example, in U.S. Pat. No. 2,984,215, issued May 16, 1961, to L. L. Charlson. Further, the constructional arrangement of the pressure control valve assembly itself may be based on the disclosure in German Pat. No. AS 1550557 wherein the control valve assembly is adjusted for steering purposes by relative displacement of the valve elements in axial and angular directions forming a diagonal adjustment path.

The control valve assembly of the present invention includes a radial outer tubular valve element 1 that is fixed in an axial direction and operatively connected through a driving connection (not shown) well known in the art to a metering pump 15 which in turn is driven by a manual steering wheel (not shown) associated with the vehicle steering system. The radially inner cylindrical surface of the valve element 1 forms a slide bearing surface for a radially inner tubular valve element 2 that is both angularly and axially displaceable relative to the valve element 1 in order to impart relative movement to valve passages along a diagonal adjusting path resulting from axial and angular motion components. The present invention also contemplates displacement of the valve passages either in an angular direction alone, or in an axial direction alone as disclosed for example in U.S. Pat. No. 2,984,215 aforementioned.

Figure 2:
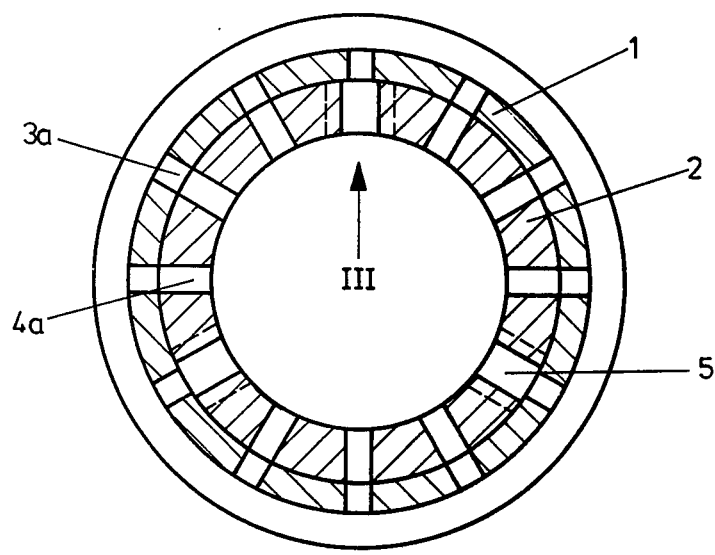
FIG. 2 is a transverse section view taken substantially through plans indicated by section line II—II in FIG. 1.

The valve element 1 is provided with two closely spaced rows of radial passage boxes 3a and 3b having relatively small flow area diameters. The valve element 2 is similarly provided with two rows of radial passage bores 4a and 4b of relatively small flow area diameters. The passage bores 3a, 3b 4a and 4b are preferrably made of the same size. The two rows of radial passage bores 4a and 4b in the valve element 2 are interrupted at angularly spaced intervals by a single passage 5 of a relatively large flow area diameter. In the neutral position of the valve elements 1 and 2 are shown in FIGS. 1 and 2, each of the larger passages 5 is in alignment and in fluid communication with one pair of the smaller passages 3a and 3b in valve element 1. The other of the passages 3a and 3b in valve element 1 are aligned with passages 4a and 4b in valve element 2.

In the neutral position of the valve elements referred to, the pressure medium is conducted from the pressure source or Pump 7 through neutral conduit 8 and operating pressure line 9 to the radial outer valve element 1. As long as the valve passages 3a, 3b, 4a, 4b and 5 are in alignment in the neutral position as aforementioned, the pressure medium will return through conduit 10 to the reservoir tank 6 along a short circuit flow path. When the valve elements are displaced relative to each other from the neutral position, the valve passages 3a, 3b, 4a, 4b and 5 are closed in succession, and depending on the direction of displacement, a servomotor 18 is supplied with pressurized medium through annular passage grooves 11 and 12 in the valve element 2, connecting lines 13 and 14, the metering pump 15 and the supply lines 16 and 17.

FIG. 7 graphically depicts the decrease in flow area through valve passages 3a, 3b, 4a, 4b and 5, as the valve elements are displaced from the neutral position. The variation in flow area denoted as curve 20 in FIG. 7, is plotted against ordinate A representing flow area and abscissa S representing displacement of the valve element 2 along its path of movement from the neutral position. The variable increase in operating pressure P delivered to the servomotor is also plotted as curve 22 in FIG. 7. During an initial passage closing phase denoted as "a" in FIG. 7, a rapid decrease in flow area occurs as shown by the curve 20 while during second and final phases of valve movement as denoted by "b" and "c" in the FIG. 7, passage closing occurs less rapidly. As a result of such passage closing characteristic, the pressure P rises in accordance with a smooth curve 22. Three variable pressure characteristic curves are shown in FIG. 7, all of which are free of any abrupt or sharp curve portions.

Figure 3:
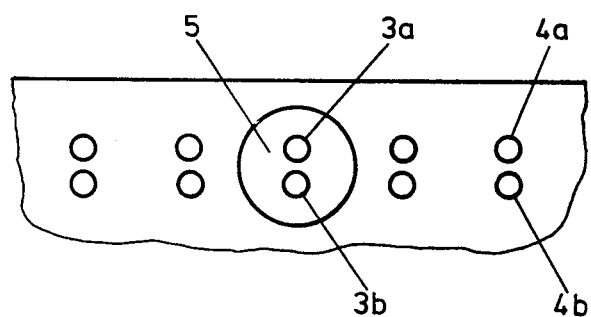
FIG. 3 is a partial plan view of a passage arrangement as viewed from a curved surface indicated by section line III—III in FIG. 2.
Figure 4:
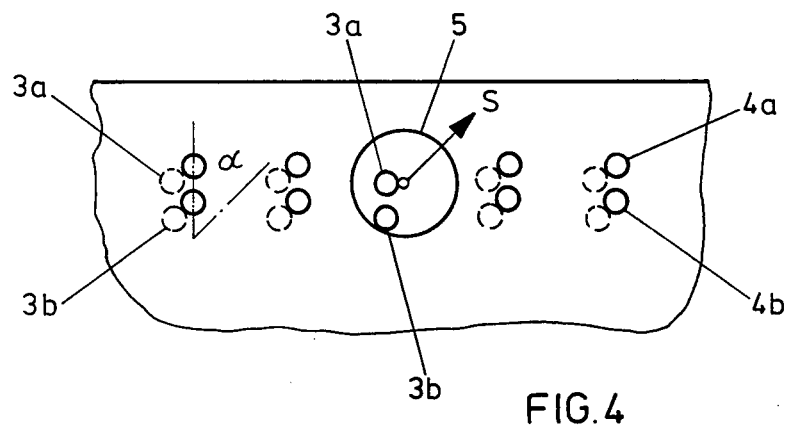
FIG. 4 is a passage arrangement view similar to that of FIG. 3 corresponding to the control valve of assembly displaced from the neutral position during an initial adjusting phase.
Figure 5:
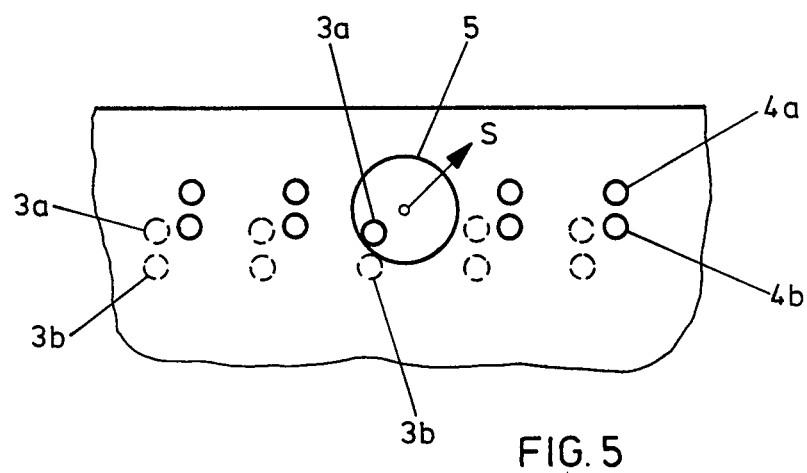
FIG. 5 is a passage arrangement view similar to FIG. 3 corresponding to the control valve assembly at the completion of a second adjustment phase.
Figure 6:
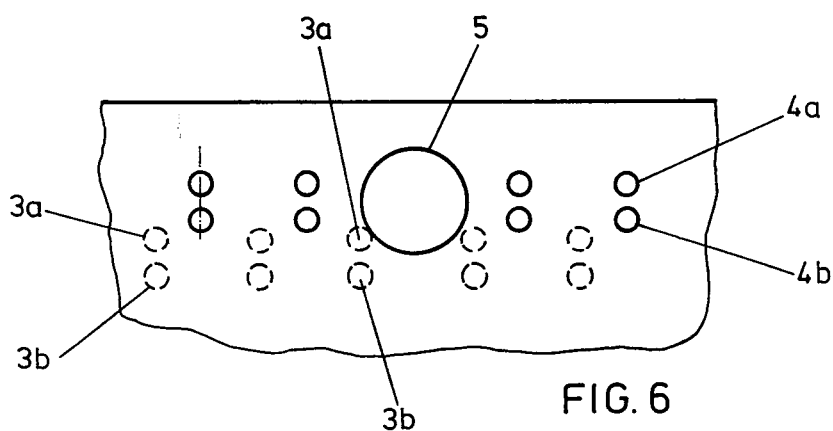

The phased closing sequence graphically depicted in FIG. 7, is illustrated in FIGS. 4–6 showing the relative passage positions during axial displacement of the valve element 2 relative to element 1. Upon completion of the first valve displacement phase, as shown in FIG. 4, the small sized passage bores 3a and 3b are displaced from alignment with the passage bores 4a and 4b as shown in FIG. 3 so as to block flow through those passages 3a and 3b previously communicating with passages 4a and 4b. However, some of the passages 3a and 3b in valve element 1 remain in communication with the large valve passages 5 to maintain a continued but reduced flow in the short circuit flow path. In the embodiment illustrated, aligned pairs of passages 3a and 3b of the two rows are in communication with the larger size passages 5. The present invention contemplates, however, the provision of single rows of passages 3a and 4a in valve elements 1 and 2.

Upon completion of the second valve displacement phase as depicted in FIG. 5, the passages 3b are closed off so that only passages 3a remain in communication with the larger size passages in valve element 2. It will be noted from FIGS. 4 and 5 that at the end of each passage closing phase "a" and "b", the passages 3b 3a are respectively disposed in tangential relationship to the walls of the large size passages 5.

Upon completion of the final valve displacement phase "c", the passages 3a in the area of the large size passages 5 are closed as shown in FIG. 6. Full operating pressure will then be delivered by the pressure controller to the servomotor. Movement of the passages 3a and 3b relative to the larger size passage 5 in response to valve displacement occurs along path S through the centers of the passages as denoted in FIGS. 4 and 5. The direction of the path S relative to the axial direction of movement of valve element 2, is at an angle of 45°.

What is claimed is:

1. A pressure medium controller for a hydrostatic steering system having a pressure inlet (8-9), a servomotor (18), two valve elements (1,2) displaceable relative to each other from a neutral position in opposite directions to two operating positions, metering means (15) operatively coupled to one of the valve elements for supplying pressure medium from said inlet to the servomotor in the operating positions of the valve elements, a pressure outlet (10) and conduit means establishing a short circuit between the inlet and the outlet for the pressure medium in the neutral position of said valve elements; said conduit means including a plurality of passages (3a, 3b, 4c, 4b, 5) in the valve elements having at least two different flow areas, the passages (5) having the larger flow areas being mounted in two (2) of the valve elements, the passages (3a, 3b) in the other (1) of the valve elements being of equal flow areas, at least two of said equal flow area passages being always in direct communication with each of the said larger flow area passages to establish said short circuit, the number of smaller flow area passages (3a, 3b, 4a, 4b) in each of the valve elements being greater than the number of said larger flow area passages.

2. The combination of claim 1 wherein said passages respectively mounted in the two valve elements are displaced relative to each other along a path at an acute angle to the displacement path of said one (2) of the valve elements in response to displacement of said one of the valve elements to one of the operating positions.

3. The combination of claim 2 wherein said acute angle is 45°.

4. The combination of claim 3 wherein flow of the pressure medium through the two passages in communication with each of the larger flow area passages is blocked in sequence during displacement of the valve elements to the operating positions.

5. The combination of claim 1, 2, 3 or 4 wherein the larger flow area passages are in direct communication with the outlet.

6. The combination of claim 2, wherein flow of the pressure medium through the two passages in communication with each of the larger flow area passages is blocked in sequence during displacement of the valve elements to the operating positions.

7. A pressure controller for a steering system having two valve elements displaceable relative to each other from a neutral position to an operating position, a source of pressure medium, a servomotor, a reservoir, and conduit means in the valve elements for delivering pressurized medium from the source to the servomotor in the operating position while establishing a short circuit between the source and the reservoir in the neutral position, the improvement residing in the conduit means, which includes a plurality of passages equal flow area in one of the valve elements, and a passage of larger flow area in the other of the valve elements directly communicating with at least two of the passages in said one of the valve elements to establish said short circuit, whereby the increase in pressure of the medium delivered to the servomotor is regulated during displacement of the valve elements to the operating position.

8. The combination of claim 7 wherein said conduit means further includes a plurality of passages of smaller flow area in the other of the valve elements communicating with the passages in said one of the valve elements during an initial phase of displacement of the valve elements toward the operating position.

9. The combination of claim 8 wherein flow through the passages of equal flow area communicating with the larger flow area passage is sequentially blocked during subsequent phases of displacement of the valve elements toward the operating position.

* * * * *